United States Patent
Meng et al.

(10) Patent No.: US 11,912,815 B2
(45) Date of Patent: Feb. 27, 2024

(54) VISCOELASTIC POLYURETHANE FOAMS

(71) Applicant: Dow Global Technologies LLC, Midland, MI (US)

(72) Inventors: Qinghao Meng, Angleton, TX (US); Meagan Broadway, Freeport, TX (US); Christopher Thiede, Lake Jackson, TX (US); Morgan A. Springs, Angleton, TX (US); Van M. Delk, Angleton, TX (US)

(73) Assignee: Dow Global Technologies LLC, Midland, MI (US)

( * ) Notice: Subject to any disclaimer, the term of this patent is extended or adjusted under 35 U.S.C. 154(b) by 564 days.

(21) Appl. No.: 17/267,171

(22) PCT Filed: Aug. 5, 2019

(86) PCT No.: PCT/US2019/045173
§ 371 (c)(1),
(2) Date: Feb. 9, 2021

(87) PCT Pub. No.: WO2020/040972
PCT Pub. Date: Feb. 27, 2020

(65) Prior Publication Data
US 2021/0301069 A1    Sep. 30, 2021

Related U.S. Application Data

(60) Provisional application No. 62/720,197, filed on Aug. 21, 2018.

(51) Int. Cl.
*C08G 18/76* (2006.01)
*C08G 18/42* (2006.01)

(52) U.S. Cl.
CPC ..... *C08G 18/7664* (2013.01); *C08G 18/4277* (2013.01); *C08G 2110/005* (2021.01); *C08G 2110/0008* (2021.01); *C08G 2110/0083* (2021.01)

(58) Field of Classification Search
None
See application file for complete search history.

(56) References Cited

U.S. PATENT DOCUMENTS

| | | | |
|---|---|---|---|
| 7,022,746 B2 | 4/2006 | Lockwood | |
| 8,791,168 B2 | 7/2014 | Babb | |
| 9,840,577 B2 | 12/2017 | Singhal | |
| 10,730,996 B2 * | 8/2020 | Lista | C08G 18/7831 |
| 2009/0036563 A1 | 2/2009 | Tai | |
| 2013/0085200 A1 | 4/2013 | Aou | |
| 2013/0289149 A1 | 10/2013 | Thoen | |
| 2017/0362375 A1 | 12/2017 | Aou | |
| 2019/0119460 A1 | 4/2019 | Tomovic | |

FOREIGN PATENT DOCUMENTS

| | | | |
|---|---|---|---|
| CA | 2242695 A1 * | 8/2009 | |
| JP | 2005015713 A * | 1/2005 | |
| JP | 3658753 B2 * | 6/2005 | |
| WO | WO 2009098966 A1 * | 8/1999 | |
| WO | 2017/207687 A | 12/2017 | |
| WO | 2017/210439 A | 12/2017 | |
| WO | 2018/017363 A | 1/2018 | |

* cited by examiner

*Primary Examiner* — Tae H Yoon

(57) ABSTRACT

Flexible polyurethane foams having high airflows and excellent viscoelastic properties are made using a polyol mixture that includes a certain liquid polyester, certain ethylene oxide polyols and certain propylene oxide polyols, and a polymeric MDI. When used in applications such as bedding, the high airflows contribute to an improved sense of comfort by the user.

14 Claims, No Drawings

VISCOELASTIC POLYURETHANE FOAMS

RELATED APPLICATIONS

This application is a 371 National Stage Application, which claims the benefit of International Application No. PCT/US2019/045173, filed on Aug. 5, 2019, which claims priority to U.S. Provisional Application No. 62/720,197, filed on Aug. 21, 2018, the contents of which are hereby incorporated by references in their entirety.

This invention relates to viscoelastic polyurethane foams that are useful in comfort applications such as pillows, mattresses, mattress toppers and seat cushions.

Viscoelastic polyurethane foams are used to make cushioning materials, in particular for bedding such as pillows and mattresses. Viscoelastic foams are distinguished from other flexible polyurethane foams by their very low resiliency and slow recovery after being compressed. A problem with these foams is that they do not conduct heat very effectively. Thus, heat given off by a user is trapped by the foam in the regions closely adjacent to the user's body. This results in a localized temperature rise that the user often perceives as being uncomfortable.

One way of improving the perceived comfort of viscoelastic foams would be to increase air circulation through the foam. Unfortunately, viscoelastic foams tend to suffer from poor airflows. A method by which the airflow of a viscoelastic foam can be increased while retaining important properties such as foam density and low resiliency would be desired.

This invention in one aspect is a flexible polyurethane foam comprising a reaction product of a reaction mixture that comprises
  a) a polyol mixture that comprises
    i) 45 to 80 weight-%, based on the weight of the polyol mixture, of an ethylene oxide copolymer containing 45 to 70% by weight polymerized ethylene oxide based on the total weight of the ethylene oxide copolymer, or mixture of two or more thereof, the ethylene oxide copolymer or mixture thereof having a number average hydroxyl functionality of 2 to 4 and an average hydroxyl equivalent weight of 175 to 600;
    ii) 10 to 30 weight-%, based on the weight of the polyol mixture, of a propylene oxide polymer containing at least 70% by weight polymerized propylene oxide based on the total weight of the propylene oxide polymer, a hydroxyl functionality of 2 to 4 and a hydroxyl equivalent weight of 800 to 2000, or mixture of two or more thereof, and
    iii) 5 to 29 weight-%, based on the weight of the polyol mixture, of a liquid polyester polyol having a hydroxyl functionality of 2 to 4 and a hydroxyl equivalent weight of 175 to 900 with the proviso that the hydroxyl equivalent weight is 175 to 600 when the polyester polyol is a polycaprolactone, or a mixture of two or more thereof;
  b) water in an amount of 1 to 4 parts by weight per 100 parts by weight of the polyol mixture;
  c) an aromatic polyisocyanate that comprises polymeric MDI, in an amount sufficient to provide an isocyanate index of 50 to 120;
  d) at least one urethane catalyst and
  e) at least one foam-stabilizing surfactant.

The flexible foam of the invention is characterized in having high airflow values, compared to an otherwise like foam made in the absence of the liquid polyester polyol. Other properties tend to remain essentially unchanged. The foam is viscoelastic, by which it is meant it exhibits a resiliency of no greater than 10% on the ASTM D3574 ball rebound test and a recovery time of at least 1 second as measured by the test method described below. This foam is particularly useful for bedding, seating and other "comfort" applications, in which the foam becomes exposed to the body heat of and/or water vapor evaporating from the body of a human user. The increased airflows contribute to greater perceived comfort. The foam or an article containing the foam may in such an application support at least a portion of the weight of a human user.

The invention is also a method of making a flexible polyurethane foam, comprising
  A. forming a reaction mixture by mixing at least the following components:
    a) a polyol mixture that comprises
      i) 45 to 80 weight-%, based on the weight of the polyol mixture, of an ethylene oxide copolymer containing 45 to 70% by weight polymerized ethylene oxide based on the total weight of the ethylene oxide copolymer, or mixture of two or more thereof, the ethylene oxide copolymer or mixture thereof having a number average hydroxyl functionality of 2 to 4 and an average hydroxyl equivalent weight of 175 to 600;
      ii) 10 to 30 weight-%, based on the weight of the polyol mixture, of a propylene oxide polymer containing at least 70% by weight polymerized propylene oxide based on the total weight of the propylene oxide polymer, a hydroxyl functionality of 2 to 4 and an average hydroxyl equivalent weight of 800 to 2000, or mixture of two or more thereof, and
      iii) 5 to 29 weight-%, based on the weight of the polyol mixture, of a liquid polyester polyol having a hydroxyl functionality of 2 to 4 and a hydroxyl equivalent weight of 175 to 900 with the proviso that the hydroxyl equivalent weight is 175 to 600 when the polyester polyol is a polycaprolactone, or a mixture of two or more thereof;
    b) water in an amount of 1 to 4 parts by weight per 100 parts by weight of the polyol mixture;
    c) an aromatic polyisocyanate that comprises polymeric MDI, in an amount sufficient to provide an isocyanate index of 50 to 120;
    d) at least one urethane catalyst and
    e) at least one foam-stabilizing surfactant, and
  B. subjecting the reaction mixture formed in step A to conditions at which the reaction mixture reacts to form the flexible polyurethane foam.

Component i) of the polyol mixture is an ethylene oxide copolymer. The ethylene oxide copolymer is a copolymer of ethylene oxide and one or more copolymerizable alkylene oxides such as 1,2-propylene oxide, 1,2-butylene oxide and 2,3-butylene oxide. Copolymers of ethylene oxide and 1,2-propylene oxide are preferred. The ethylene oxide copolymer contains 45 to 70% by weight polymerized ethylene oxide based on the total weight of the ethylene oxide copolymer. The copolymer may be a random and/or block copolymer.

Component i) may include two or more of such ethylene oxide copolymers.

Component i) has a number average hydroxyl functionality of 2 to 4, preferably 2 to 3, and an average hydroxyl equivalent weight of 175 to 600, preferably 200 to 500. These functionality and equivalent weight values apply to component i) as a whole rather than individual ethylene oxide copolymers within component i). All polyether polyol functionalities herein are nominal functionalities, being equal to the number of hydroxyl groups on the initiator compounds alkoxylated to produce the polyether polyol. Equivalent weights of a polyol or polyol mixture can measured by titration methods, which yield a hydroxyl number in mg KOH/g, which hydroxyl number is converted to hydroxyl equivalent weight using the relationship: hydroxyl equivalent weight=56,100/OH number. Average equivalent weights for a polyol mixture alternatively can be calculated from the hydroxyl equivalent weights of the constituent polyols, as determined in this manner. When a mixture of ethylene oxide copolymers is present, individual components of the mixture may have functionalities and equivalent weights within or outside these values, provided that the mixture has the aforementioned values of functionality and equivalent weight.

Component i) constitutes 45 to 80 percent of the total weight of the polyol mixture. The weight of the polyol mixture is the sum of the weight of all materials in the reaction mixture that contain two or more hydroxyl groups (excluding water). Component i) in some embodiments constitutes at least 50 or at least 55 percent of the total weight of the polyol mixture and may constitute up to 75 percent, up to 70 percent or up to 65 percent thereof.

Component ii) of the polyol mixture is a 1,2-propylene oxide polymer having a hydroxyl functionality of 2 to 4 and a hydroxyl equivalent weight of 800 to 2000, or mixture of two or more thereof. The propylene oxide polymer is a homopolymer of propylene oxide or a copolymer of propylene oxide and one or more copolymerizable alkylene oxides such as ethylene oxide, 1,2-butylene oxide and 2,3-butylene oxide. Copolymers of 1,2-propylene oxide and ethylene oxide are preferred. The propylene oxide copolymer contains at least 70% by weight polymerized propylene oxide based on the total weight of the propylene oxide copolymer. If a copolymer, the propylene oxide polymer may be a random and/or block copolymer.

The hydroxyl functionality of each propylene oxide polymer within component ii) may be 2 to 3. The hydroxyl equivalent weight of each propylene oxide polymer within component ii) may be, for example, at least 900, at least 1000 or at least 1200 and may be up to 1750, up to 1500 or up to 1200.

Any propylene oxide polymer within component ii) may be a polymer polyol, i.e., a dispersion of polymer particles in the propylene oxide polymer. The dispersed polymer particles may constitute, for example, at least 1%, at least 5% or at least 10% of the total weight of the polymer polyol and may constitute, for example, up to 60%, up to 50%, up to 40%, up to 30% or up to 20% of the total weight thereof. The dispersed polymer particles may be, for example, polyurea, polyurethane, and/or polyhydrazide, or a polymer of one or more vinyl monomers.

Component ii) constitutes 10 to 30 percent of the total weight of the polyol mixture.

Component iii) is a liquid (at 22° C.) polyester polyol having a hydroxyl functionality of 2 to 4 and a hydroxyl equivalent weight of 175 to 900 (175 to 600 in the case of a polycaprolactone), or a mixture of two or more thereof. The hydroxyl equivalent weight of each such liquid polyester polyol (including a polycaprolactone) may be at least 200 and may be up to 550, up to 500, up to 450, up to 400 or up to 350. In some embodiments the hydroxyl functionality of each such liquid polyester polyol is 2 to 3.

The liquid polyester polyol may be aromatic, aliphatic (including cycloaliphatic) or aromatic-aliphatic. If aliphatic, it may be saturated or unsaturated. Examples of suitable polyesters include polyester polyols corresponding to a condensation product of one or more aliphatic polyols (linear, branched or cyclic), such as ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine and N-methyldiethanolamine, or one or more aromatic polyols, and mixtures of any two or more of these compounds, with one or more polycarboxylic acids or an ester or anhydride derivative thereof, such as maleic acid, fumaric acid, 1,6-hexanedioic acid, dodecanedioic acid, azelaic acid, sebacic acid, adipic acid, 1,18-octadecanedioic acid, phthalic acid, terephthalic acid, succinic acid and mixtures of any two or more of these.

Other examples of suitable polyesters include polylactones such as a polycaprolactone including, for example, polycaprolactone and caprolactone copolymers.

The liquid polyester polymer constitutes 5 to 29 percent of the total weight of the polyol mixture. A preferred amount is at least 8 percent and up to 25 percent or up to 20 percent on the same basis.

The polyol mixture may contain other polyols in addition to components i)-iii) as described above. If such additional polyols are present, they are preferably present in small amounts, such that components i)-iii) together constitute at least 80%, more preferably at least 85% of the total weight of the polyol mixture. Components i)-iii) may constitute up to 100%, up to 98%, up to 95% or up to 90% of the total weight of the polyol mixture.

Among the other polyols that may be present in the polyol mixture is iv) one or more propylene oxide homopolymers or copolymers containing at least 70% by weight polymerized propylene oxide based on the weight of the copolymer, the propylene oxide homopolymer or copolymer having a hydroxyl equivalent weight of 175 to 600 and a hydroxyl functionality of 2 to 8. In the case of a copolymer, this polyol is a copolymer of propylene oxide and one or more copolymerizable alkylene oxides such as ethylene oxide, 1,2-butylene oxide and 2,3-butylene oxide. Copolymers of 1,2-propylene oxide and ethylene oxide are preferred. If a copolymer, the propylene oxide polymer may be a random and/or block copolymer.

The hydroxyl functionality of each propylene oxide polymer within component iv) may be 2 to 3. The hydroxyl equivalent weight of each propylene oxide polymer within component iv) may be, for example, up to 550 or up to 500.

Component iv), if present, may constitute up to 20 percent of the total weight of the polyol mixture. In specific embodiments it may constitute at least 5 or at least 8 weight percent thereof.

Other optional polyols include chain extenders, i.e. compounds having hydroxyl equivalent weights of less than 175 and exactly 2 hydroxyl groups per molecule, and crosslinkers, i.e., compounds having three or more hydroxyl groups and hydroxyl equivalent weights of less than 175.

Examples of chain extenders include 1,2-ethane diol, 1,2- or 1,3-propane diol, 1,4-butane diol, diethylene glycol, triethylene glycol, dipropylene glycol, tripropylene glycol, neopentyl glycol and alkoxylates of any of the foregoing having a hydroxyl equivalent weight of less than 175. Chain extenders, if present, preferably constitute no more than 5%, more preferably no more than 2%, of the weight of the polyol mixture. Chain extenders can be absent from the polyol mixture.

Examples of crosslinkers include glycerin, trimethylolpropane, trimethylolethane, erythritol, pentaerythritol, triethanolamine, diethanolamine and alkoxylates of any of the foregoing having a hydroxyl equivalent weight of less than 175. Crosslinkers, if present, preferably constitute no more than 5%, more preferably no more than 2%, and even more preferably no more than 1% or no more than 0.5% of the weight of the polyol mixture. Crosslinkers can be absent from the polyol mixture.

Other polyols, different from the foregoing, if present at all, preferably are present in amounts no greater than 5%, especially no greater than 3%, of the total weight of the polyol mixture.

The polyisocyanate includes polymeric diphenylmethane diisocyanate (MDI). Polymeric MDI is a mixture of MDI and one or more polymethylene polyphenyl polyisocyanate compounds that have three or more phenylisocyanate groups. The MDI may constitute no more than 80%, such as from 30 to 80% or 50 to 80%, of the total weight of the polymeric MDI. The polymeric MDI may have, for example, an isocyanate functionality of 2.1 to 2.8 and an isocyanate equivalent weight of 126 to 140 (as measured by titration). All MDI and polymethylene polyphenyl isocyanate compounds in the polyisocyanate are considered for purposes of this invention to collectively constitute the polymeric MDI portion of the polyisocyanate.

The polymeric MDI may constitute the entire mass of the polyisocyanate. Alternatively, the polymeric MDI may be blended with one or more other polyisocyanates that are neither MDI nor polymethylene polyphenyl polyisocyanates. If present, such other polyisocyanate may constitute, for example, up to 25%, up to 10% or up to 5% of the total weight of the polyisocyanate.

The urethane catalyst(s) catalyze either or both of the alcohol-isocyanate reaction and the water-isocyanate reaction. Suitable catalysts include, for example, tertiary amines, cyclic amidines, tertiary phosphines, various metal chelates, acid metal salts, strong bases, various metal alcoholates and phenolates and metal salts of organic acids. Examples of metal-containing catalysts are tin, bismuth, cobalt and zinc salts. Catalysts of most importance are tertiary amine catalysts, cyclic amidines, zinc catalysts and tin catalysts. Examples of tertiary amine catalysts include trimethylamine, triethylamine, N-methylmorpholine, N-ethylmorpholine, N,N-dimethylbenzylamine, N,N-dimethylethanolamine, N, N, N',N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains 4 to 18 carbon atoms. Mixtures of these tertiary amine catalysts are often used.

A reactive amine catalyst such as DMEA (dimethylethanolamine) or DMAPA (dimethylaminopropyl amine), or an amine-initiated polyol, acting as an autocatalytic polyol, may also be used to provide catalyze while reducing VOC's (volatile organic compounds). The weight of any amine-initiated polyol counts toward the total weight of the polyol mixture and, if falling within the scope of any of components i), ii) and iv) thereof, counts toward the weight of that component.

Tin catalysts include stannic chloride, stannous chloride, stannous octoate, stannous oleate, dimethyltin dilaurate, dibutyltin dilaurate, tin ricinoleate and other tin compounds of the formula $SnR_n(OR)_{4-n}$, wherein R is alkyl or aryl having up to 18 carbon atoms and n is 0 to 2, and the like. Zinc and tin catalysts are generally used in conjunction with one or more tertiary amine catalysts, if used at all.

Catalysts are typically used in small amounts, for example, each catalyst being employed from about 0.0015 to about 5 or 0.1 to 0.5 parts by weight per 100 parts by weight of the polyol mixture.

The foam-stabilizing surfactant helps stabilize gas bubbles formed during the foaming process until the polymer has cured. A wide variety of silicone surfactants as are commonly used in making polyurethane foams can be used in making the foams with the polymer polyols or dispersions of this invention. Examples of such silicone surfactants are commercially available under the trade names Tegostab™ (Th. Goldschmidt and Co.), Niax™ (GE OSi Silicones) and Dabco™ (Air Products and Chemicals). The surfactant(s) may be present in an amount of 0.25 to 5 or 0.5 to 2.5 parts by weight per 100 parts by weight of the polyol mixture.

Other suitable optional ingredients are additional isocyanate-reactive materials, different from components a)-e). If present, these preferably constitute up to 5 parts by weight or up to 2 parts by weight, per 100 parts by weight of the quasi-prepolymer.

The reaction mixture also may contain various ingredients such as fillers, colorants, antioxidants, preservatives, biocides, fragrances, thickening agents (such as xanthan gum, various water-soluble cellulose ethers or polyacrylamide), mixing aids, wetting agents (when fillers are present) and the like. If present, these preferably constitute up to 10% or up to 5% of the total weight of the reaction mixture.

Polyurethane foam is made by combining the ingredients to form a reaction mixture and subjecting the resulting reaction mixture to conditions under which the reaction mixture reacts to form the flexible polyurethane foam.

The various ingredients can be combined in any order, although it is preferred to add the polyisocyanate last or simultaneously with the other ingredients to avoid premature reaction before the rest of the ingredients can be added. The various components of the polyol mixture all can be combined before forming the reaction mixture. Alternatively, the various components of the polyol mixture can be combined at the same time they are combined with the polyisocyanate. It is also possible to form the components of the polyol mixture into various subcombinations that are brought together at the same time as the polyisocyanate is added.

Curing generally occurs spontaneously upon mixing the polyols with the polyisocyanate, and so a broad range of conditions is suitable for performing the curing reaction. The curing temperature may be, for example, as low as 0° C. or as high as, for example, 100° C. Temperatures near room temperature or slightly elevated temperature are entirely suitable and generally preferred. Thus, the curing temperature may be at least 15° C. or at least 20° C. and up to 50° C., 40° C. or 35° C. The curing reaction produces carbon dioxide gas that forms cells and expands the reaction mixture as the curing takes place.

The curing step may be performed in an open container, in which the rising foam expands vertically against the weight of the atmosphere and/or the weight of a thin film. Such a free-rise process may be performed by dispensing the reaction mixture into a trough where it rises and cures.

The curing step may instead be performed in a closed container such as a closed mold, in which expansion is constrained by the internal dimensions of the cavity to produce a foam having a size and shape corresponding to that of the mold cavity.

Foam of the invention may have a foam density of, for example, 40 to 144 kg/m$^3$, as measured according to ASTM D3574. In some embodiments, the foam density is 40 to 80 kg/m$^3$ or 40 to 64 kg/m$^3$.

Flexible foam of the invention is viscoelastic, having a resiliency, as measured by the ASTM D3574 ball rebound test, of 10% or less and a recovery time, measured as described in below, of at least one second. The resiliency may be 6% or less, 5% or less or 4% or less and the recovery time may be at least 1.1, at least 1.2, at least 1.5 or at least 2.0 seconds.

An advantage of the invention is that high airflows are obtained. The airflow may be, for example, at least 2.6, at least 2.7, at least 3.1 or at least 3.3 L/s, as measured according to ASTM D3574. Airflow may be, for example, up to 5.0, up to 4.5 or up to 4.0 L/s.

Foam of the invention is useful for bedding, seating and other "comfort" applications. Comfort applications include those in which during use the foam becomes exposed to the body heat of or water vapor evaporating from the body of a human user. The foam or an article containing the foam in such applications often supports at least a portion of the weight of a human user and the foam becomes compressed during use. Examples of such comfort applications include pillows, mattress toppers, mattresses, comforters, furniture and/or automotive seating, quilting, insulated clothing and the like.

The following examples are provided to illustrate the invention, but are not intended to limit the scope thereof. All parts and percentages are by weight unless otherwise indicated.

In the following examples:

Polyether Polyol 1 is an ethylene oxide copolymer corresponding to component i) of the polyol mixture. Polyether Polyol 1 is a trifunctional random copolymer of ethylene oxide and 1,2-propylene oxide that contains 60% polymerized ethylene oxide. Its number average molecular weight is 1000 and its hydroxyl number is 168, which corresponds to a hydroxyl equivalent weight of about 333.

Polyether Polyol 2 is a propylene oxide copolymer corresponding to component ii) of the polyol mixture. Polyether Polyol 2 is a trifunctional random copolymer of ethylene oxide and 1,2-propylene oxide that contains 8% polymerized ethylene oxide. Its number average molecular weight is 3000 and its hydroxyl number is 56.4, which corresponds to a hydroxyl equivalent weight of about 1000.

Polyether Polyol 3 is a trifunctional propylene oxide homopolymer corresponding to optional component iv) of the polyol mixture. Its number average molecular weight is 1000 and its hydroxyl number is 167, which corresponds to a hydroxyl equivalent weight of about 336.

Polyester Polyol 1 is a diethylene glycol-phthalic acid polyol. It has a hydroxyl functionality of 2.2 and a hydroxyl number of 225, which corresponds to a hydroxyl equivalent weight of 250.

Polyester Polyol 2 is a diethylene glycol-adipic acid polyol. It has a hydroxyl functionality of 2 and a hydroxyl number of 175, which corresponds to a hydroxyl equivalent weight of 320.

Polyester Polyol 3 is a diethylene glycol/trimethylolpropane-adipic acid copolymer having a hydroxyl functionality of 2.6 and a hydroxyl equivalent weight of 967.

Polyester Polyol 4 is a polycaprolactone having a hydroxyl equivalent weight of 300.

Polyester Polyol 5 is a polycaprolactone having a hydroxyl equivalent weight of 500.

Polyester Polyol 6 is a polycaprolactone having a hydroxyl equivalent weight of 622.

Polyester Polyol 7 is a polycaprolactone having a hydroxyl equivalent weight of 987.

The PMDI is a polymeric MDI having an average isocyanate functionality of 2.2 and an isocyanate content of 33%, which corresponds to an isocyanate equivalent weight of 127.

The Surfactant is a commercially available silicone foam-stabilizing surfactant.

The Catalyst is a mixture of amine and tin urethane catalysts.

EXAMPLES 1-2 AND COMPARATIVE SAMPLES A-C

Examples 1-2 and Comparative Samples A-C are made from the ingredients listed in Table 1. All ingredients except the polyisocyanate and tin catalyst are mixed in a high-speed pin mixer at room temperature. The tin catalyst is added and mixed in, followed by the PMDI. The mixture is immediately poured into a 38 cm×38 cm×24 cm plastic-lined box. The reaction mixture rises and cures in the box without added heating. After curing, the skins are removed to produce specimens for property testing.

TABLE 1

| Ingredient | Parts By Weight | | | | |
| --- | --- | --- | --- | --- | --- |
|  | Comp. A* | Ex. 1 | Ex. 2 | Comp. B* | Comp. C* |
| Polyether Polyol 1 (i)) | 60 | 60 | 60 | 60 | 60 |
| Polyether Polyol 2 (ii)) | 20 | 20 | 20 | 20 | 20 |
| Polyether Polyol 3 (iv)) | 20 | 10 | 10 | 20 | 10 |
| Polyester Polyol 1 (iii)) | 0 | 10 | 0 | 0 | 0 |
| Polyester Polyol 2 (iii)) | 0 | 0 | 10 | 0 | 0 |
| Polyester Polyol 3 | 0 | 0 | 0 | 0 | 10 |
| Water | 2.0 | 2.0 | 2.0 | 2.2 | 2.2 |
| Surfactant | 0.8 | 0.8 | 0.8 | 0.8 | 0.8 |
| Catalyst | 0.25 | 0.25 | 0.25 | 0.25 | 0.25 |
| PMDI | 78 index | 78 index | 78 index | 78 index | 78 index |

*Comparative.

The foams are conditioned for 24 hours at room temperature and ambient humidity before testing. Density, indentation force deflection (IFD), compression set, tear resistance, elongation, tensile strength, airflow and resilience (by the ball rebound test) are evaluated according to ASTM D3574. Recovery time is measured using a RESIMAT apparatus on a 10.2 cm×10.2 cm×5.1 cm test specimen. The specimen is compressed to a strain level of 78% and held for 60 seconds. The pressure is released and the time required for the sample to reach 95% of its original thickness is reported as the recovery time.

Results are as indicated in Table 2.

TABLE 2

| Test | Comp. A* | Ex. 1 | Ex. 2 | Comp. B* | Comp. C* |
| --- | --- | --- | --- | --- | --- |
| Polyester Polyol HEW[1] | N/A | 250 | 320 | N/A | 967 |
| Airflow, L/s (ft³/min) | 2.3 (4.9) | 3.5 (7.4) | 3.35 (7.1) | 2.0 (4.3) | 3.35 (7.1) |
| Recovery time, s | 1.22 | 1.04 | 1.68 | 2.5 | 0.71 |
| Resiliency, % | 4.0 | 3.6 | 2.0 | 2.4 | 5.0 |
| Density, kg/m³ (pcf) | 48.5 (3.03) | 49.5 (3.09) | 48.4 (3.02) | 47.4 (2.96) | 47.4 (2.96) |

TABLE 2-continued

| Test | Comp. A* | Ex. 1 | Ex. 2 | Comp. B* | Comp. C* |
|---|---|---|---|---|---|
| 25% IFD, N (lbf) | 39 (8.8) | 34.5 (7.8) | 28 (6.3) | 36.5 (8.2) | 31 (7.0) |
| 65% IFD, N (lbf) | 77.5 (17.4) | 70 (15.7) | 57.5 (12.9) | 71 (16.0) | 63 (14.2) |
| Return 25% IDF, N (lbf) | 36.5 (8.2) | 32 (7.2) | 26 (5.9) | 33.5 (7.5) | 29 (6.5) |
| IFD Hysteresis, % | 92.9 | 93.1 | 93 | 91.3 | 93.9 |
| Tear str., N/m (pli) | 147 (0.84) | 173 (0.99) | 170 (0.97) | 156 (0.89) | 208 (1.19) |
| Tensile str., kPa (psi) | 37.2 (5.4) | 40.7 (5.9) | 42.1 (6.1) | 49.6 (7.2) | 64.1 (9.3) |
| Elongation, % | 130 | 146 | 149 | 128 | 148 |
| 90% Compression Set, | 79.2 | 0.9 | 1.1 | 84.6 | 0.7 |

*Comparative.
HEW = hydroxyl equivalent weight.

The data in Table 2 demonstrates the effect of the invention. When the polyester polyol is absent (Comp. Samples A and B), airflow is in the range of only 2-2.3 L/s (4.3-4.9 ft³/min) Substituting a polyester polyol with a hydroxyl equivalent weight of 250 or 320 for a portion of Polyether Polyol 3 increases airflow to well above 3.3 L/s (7 ft³/min). Recovery time is decreased slightly in Ex. 1 and increased slightly in Ex. 2. Resilience decreases, which is desirable in a viscoelastic foam. Other foam properties are not affected greatly. In Comparative Sample C, the use of the higher equivalent weight polyester polyol leads to good airflow, but faster recovery time and a higher resiliency foam, wither lower loadbearing.

EXAMPLE 3-4 AND COMPARATIVE SAMPLES D-F

Example 3-4 and Comparative Samples D-F are made from the ingredients listed in Table 3, using the same process as described in the previous examples.

TABLE 3

| | Parts By Weight | | | | |
|---|---|---|---|---|---|
| Ingredient | Comp. D* | Ex. 3 | Ex. 4 | Comp. E* | Comp. F* |
| Polyether Polyol 1 (i)) | 60 | 60 | 60 | 60 | 60 |
| Polyether Polyol 2 (ii)) | 20 | 20 | 20 | 20 | 20 |
| Polyether Polyol 3 (iv)) | 20 | 10 | 10 | 10 | 10 |
| Polyester Polyol 4 (iii)) | 0 | 10 | 0 | 0 | 0 |
| Polyester Polyol 5 (iii)) | 0 | 0 | 10 | 0 | 0 |
| Polyester Polyol 6 | 0 | 0 | 0 | 10 | 0 |
| Polyester Polyol 7 | 0 | 0 | 0 | 0 | 10 |
| Water | 2.2 | 2.2 | 2.2 | 2.2 | 2.2 |
| Surfactant | 0.8 | 0.8 | 0.8 | 0.8 | 0.8 |
| Catalyst | 0.25 | 0.25 | 0.25 | 0.25 | 0.25 |
| PMDI | 78 index | 78 index | 78 index | 78 index | 78 index |

*Comparative.
HEW = hydroxyl equivalent weight.

The resulting foams are tested as described in the previous examples. Glass transition temperature ($T_g$) is measured by differential scanning calorimetry, with the $T_g$ being reported as the temperature of peak tan delta value. Test conditions are 1.0 Hertz frequency, 0.1% strain, 15 g pre-load and heating rate of 3° C./minute. Results are as indicated in Table 4.

TABLE 4

| Test | Comp. D* | Ex. 3 | Ex. 4 | Comp. E* | Comp. F* |
|---|---|---|---|---|---|
| Polyester Polyol HEW[1] | N/A | 300 | 500 | 622 | 987 |
| Airflow, L/s (ft³/min) | 2.6 (5.5) | 2.8 (6.0) | 2.7 (5.8) | 1.8 (3.9) | 1.5 (3.2) |
| Recovery time, s | 2.36 | 1.79 | 2.29 | 2.9 | 3.56 |
| Resiliency, % | 3.0 | 2.0 | 1.2 | 2.0 | 1.0 |
| Density, kg/m³ (pcf) | 45.2 (2.82) | 46.6 (2.91) | 45.5 (2.84) | 45.8 (2.86) | 45.5 (2.84) |
| 25% IFD, N (lbf) | 35 (7.9) | 41 (9.2) | 36.5 (8.2) | 42.5 (9.6) | 38.5 (8.6) |
| 65% IFD, N (lbf) | 67.5 (15.2) | 78.5 (17.6) | 69.5 (15.6) | 82.5 (18.5) | 73.5 (16.5) |
| Return 25% IDF, N (lbf) | 32 (7.2) | 38.5 (8.6) | 34.5 (7.7) | 39 (8.8) | 35 (7.8) |
| IFD Hysteresis, % | 92.2 | 94.0 | 93.2 | 91.0 | 90.1 |
| Tear str., N/m (pli) | 147 (0.84) | 170 (0.97) | 163 (0.93) | 168 (0.96) | 151 (0.86) |
| Tensile str., kPa (psi) | 42.1 (6.1) | 49.0 (7.1) | 41.4 (6.0) | 48.3 (7.0) | 40.7 (5.9) |
| Elongation, % | 126 | 121 | 123 | 122 | 116 |
| 90% Compression Set, | 83.8 | 0.9 | 1.0 | 82.8 | 85.1 |
| $T_g$, ° C. | 23.2 | 20.6 | 17.5 | 24.7 | 25.5 |

*Comparative.
HEW = hydroxyl equivalent weight.

The data in Table 2 shows the effect of substituting a portion of Polyether Polyol 3 with polycaprolactones of varying equivalent weight. When the polycaprolactone has a hydroxyl equivalent weight of 300-500, an increase in airflow is seen, while other beneficial properties are maintained. Increasing the hydroxyl equivalent weight of the polycaprolactone to 622 or 987 leads to a loss of airflow.

COMPARATIVE SAMPLES G-J

Resilient polyurethane foams are made from the formulations shown in Table 5, using the methods described in preceding examples. Airflows are measured as before.

TABLE 5

| | Parts by Weight | | | |
|---|---|---|---|---|
| Ingredient | Comp. G* | Comp. H* | Comp. I* | Comp. J* |
| Polyether Polyol 3 (iv)) | 100 | 85 | 85 | 85 |
| Polyester Polyol 1 (iii)) | 0 | 15 | 0 | 0 |
| Polyester Polyol 2 (iii)) | 0 | 0 | 15 | 0 |
| Polyester Polyol 3 | 0 | 0 | 0 | 15 |
| Water | 2.8 | 2.8 | 2.8 | 2.8 |
| Surfactant | 0.8 | 0.8 | 0.8 | 0.8 |
| Catalyst | 0.37 | 0.37 | 0.37 | 0.37 |
| Toluene diisocyanate | To 105 index | To 105 index | To 105 index | To 105 index |
| Properties | | | | |
| Polyester Polyol Equivalent Weight | N/A | 250 | 320 | 967 |
| Airflow, L/s (ft³/min) | 1.9 (4.1) | 0.4 (0.9) | 0.05 (0.1) | 1.8 (3.9) |
| Resilience, % | 45 | 30 | 16 | 45 |

*Comparative.

The results of these experiments show that the inclusion of the polyester polyol in a conventional (non-viscoelastic, resilient) polyurethane foam has no beneficial effect on airflow, regardless of equivalent weight. This underscores the unique and unexpected effect seen when the polyester polyol is included in a viscoelastic foam formulation.

What is claimed is:

1. A flexible polyurethane foam comprising a reaction product of a reaction mixture that comprises
   a) a polyol mixture that comprises
      i) 45 to 80 weight-%, based on the weight of the polyol mixture, of an ethylene oxide copolymer containing 45 to 70% by weight polymerized ethylene oxide based on the total weight of the ethylene oxide copolymer, or mixture of two or more thereof, the ethylene oxide copolymer or mixture thereof having a number average hydroxyl functionality of 2 to 4 and an average hydroxyl equivalent weight of 175 to 600;
      ii) 10 to 30 weight-%, based on the weight of the polyol mixture, of a propylene oxide polymer containing at least 70% by weight polymerized propylene oxide based on the total weight of the propylene oxide polymer, a hydroxyl functionality of 2 to 4 and a hydroxyl equivalent weight of greater than 500 to 2000, or mixture of two or more thereof, and
      iii) 5 to 29 weight-%, based on the weight of the polyol mixture, of a liquid polyester polyol having a hydroxyl functionality of 2 to 4 and a hydroxyl equivalent weight of 175 to 900 with the proviso that the hydroxyl equivalent weight is 175 to 600 when the polyester polyol is a polycaprolactone, or a mixture of two or more thereof;
   b) water in an amount of 1 to 4 parts by weight per 100 parts by weight of the polyol mixture;
   c) an aromatic polyisocyanate that comprises polymeric diphenylmethane isocyanate (MDI), in an amount sufficient to provide an isocyanate index of 50 to 120;
   d) at least one urethane catalyst and
   e) at least one foam-stabilizing surfactant.

2. The flexible polyurethane foam of claim 1 wherein the polyester polyol is selected from polyester polyols corresponding to a condensation product of one or more of ethanediol, 1,2-propanediol, 1,3-propanediol, glycerol, trimethylolpropane, 1,6-hexanediol, 1,2,6-hexanetriol, butenediol, sucrose, glucose, sorbitol, pentaerythritol, mannitol, triethanolamine, N-methyldiethanolamine with one or more of maleic acid, fumaric acid, 1,6-hexanedioic acid, dodecanedioic acid, azelaic acid, sebacic acid, adipic acid, 1,18-octadecanedioic acid, phthalic acid, terephthalic acid and succinic acid.

3. The flexible polyurethane foam of claim 2 wherein the polyester polyol is selected from the group consisting of diethylene glycol-phthalic acid polyols, diethylene glycol-adipic acid polyols and diethylene glycol/trimethylolpropane-adipic acid polyols.

4. The flexible polyurethane foam of claim 1 wherein the polyester polyol the a polycaprolactone.

5. The flexible polyurethane foam of claim 1 wherein the polyester polyol has a hydroxyl equivalent weight of up to 400.

6. The flexible polyurethane foam of claim 1 wherein the polyol mixture further comprises iv) 5 to 20 weight percent, based on the weight of the polyol mixture, of one or more propylene oxide homopolymers or copolymers containing at least 70% by weight polymerized propylene oxide based on the weight of the copolymer, the propylene oxide homopolymer or copolymer having a hydroxyl equivalent weight of 175 to 600 and a hydroxyl functionality of 2 to 8.

7. A method of making a flexible polyurethane foam, comprising
   A. forming a reaction mixture by mixing at least the following components:
      a) a polyol mixture that comprises
         i) 45 to 80 weight-%, based on the weight of the polyol mixture, of an ethylene oxide copolymer containing 45 to 70% by weight polymerized ethylene oxide based on the total weight of the ethylene oxide copolymer, or mixture of two or more thereof, the ethylene oxide copolymer or mixture thereof having a number average hydroxyl functionality of 2 to 4 and an average hydroxyl equivalent weight of 175 to 600;
         ii) 10 to 30 weight-%, based on the weight of the polyol mixture, of a propylene oxide polymer containing at least 70% by weight polymerized propylene oxide based on the total weight of the propylene oxide polymer, a hydroxyl functionality of 2 to 4 and an average hydroxyl equivalent weight of greater than 500 to 2000, or mixture of two or more thereof, and
         iii) 5 to 29 weight-%, based on the weight of the polyol mixture, of a liquid polyester polyol having a hydroxyl functionality of 2 to 4 and a hydroxyl equivalent weight of 175 to 900 with the proviso that the hydroxyl equivalent weight is 175 to 600 when the polyester polyol is a polycaprolactone, or a mixture of two or more thereof;
      b) water in an amount of 1 to 4 parts by weight per 100 parts by weight of the polyol mixture;
      c) an aromatic polyisocyanate that comprises polymeric diphenylmethane isocyanate (MDI), in an amount sufficient to provide an isocyanate index of 50 to 120;
      d) at least one urethane catalyst and
      e) at least one foam-stabilizing surfactant,
      and
   B. subjecting the reaction mixture formed in step A. to conditions at which the reaction mixture reacts to form the flexible polyurethane foam.

8. A flexible polyurethane foam made in accordance with claim 7.

9. The flexible polyurethane foam of claim 8 which has an airflow of at least 2.6 L/s as measured according to ASTM D3574.

10. The flexible polyurethane foam of claim 9 which has a density of 40 to 80 kg/m3 as measured according to ASTM D3574.

11. The flexible polyurethane foam of claim 10 which has resiliency of 10% or less as measured according to ASTM D3574.

12. The flexible polyurethane foam of claim 11 which has recovery time of at least one second.

13. A cushion comprising a flexible polyurethane foam of claim 1.

14. The cushion of claim 13, which is a pillow, mattress topper, mattress, comforter, furniture seat or back, automotive seat or back; quilt or article of insulated clothing.

* * * * *